United States Patent
Kennedy

[11] Patent Number: 6,050,208
[45] Date of Patent: Apr. 18, 2000

[54] COMPOSITE STRUCTURAL LAMINATE

[75] Inventor: Stephen J. Kennedy, Ottawa, Canada

[73] Assignee: Fern Investments Limited, St. Helier, United Kingdom

[21] Appl. No.: 09/075,108

[22] Filed: May 8, 1998

Related U.S. Application Data

[63] Continuation-in-part of application No. 08/746,539, Nov. 13, 1996, Pat. No. 5,778,813.

[51] Int. Cl.$^7$ .............................. B63B 25/08; B63B 3/62; B63B 5/24
[52] U.S. Cl. ........................ 114/74 A; 114/356; 114/357
[58] Field of Search ................................. 114/69, 74 A, 114/357, 356; 428/425.8

[56] References Cited

U.S. PATENT DOCUMENTS

| | | | |
|---|---|---|---|
| 1,289,760 | 12/1918 | Hirota | 114/69 |
| 3,003,810 | 10/1961 | Kloote et al. | 220/444 |
| 3,298,345 | 1/1967 | Pratt | 114/74 A |
| 3,337,079 | 8/1967 | Clarke et al. | 114/74 A |
| 3,435,470 | 4/1969 | Krenzler | 114/357 |
| 3,732,138 | 5/1973 | Almog . | |
| 3,911,190 | 10/1975 | Myers et al. . | |
| 4,061,815 | 12/1977 | Poole, Jr. | 428/215 |
| 4,079,689 | 3/1978 | Llorente | 114/74 R |
| 4,083,318 | 4/1978 | Verolme | 114/74 A |
| 4,089,285 | 5/1978 | Okamoto et al. | 114/74 A |
| 4,100,860 | 7/1978 | Gablin et al. | 220/44 A |
| 4,116,150 | 9/1978 | McCown . | |
| 4,410,595 | 10/1983 | Matsumoto et al. | 428/412 |
| 4,672,906 | 6/1987 | Asai | 114/74 A |
| 4,698,278 | 10/1987 | Prang | 428/314.4 |
| 4,739,722 | 4/1988 | Rogstad . | |
| 4,810,321 | 3/1989 | Wank et al. | 156/244.23 |
| 4,851,271 | 7/1989 | Moore, III et al. | 428/34.5 |
| 4,979,553 | 12/1990 | Lowry, III et al. | 160/113 |
| 4,992,323 | 2/1991 | Vogelesang et al. | 428/215 |
| 5,030,488 | 7/1991 | Sobolev | 428/35.9 |
| 5,070,801 | 12/1991 | Frederick | 114/74 R |
| 5,107,782 | 4/1992 | Frederick | 114/74 R |
| 5,203,272 | 4/1993 | Kassinger et al. | 114/74 R |
| 5,218,919 | 6/1993 | Krulikowski, III et al. | 114/84 |
| 5,219,629 | 6/1993 | Sobolev | 428/35.9 |
| 5,225,812 | 7/1993 | Faghri | 114/74 R |
| 5,349,914 | 9/1994 | Lapo et al. | 114/74 R |
| 5,477,797 | 12/1995 | Stuart | 114/65 R |
| 5,520,132 | 5/1996 | Crippen | 114/74 R |
| 5,621,024 | 4/1997 | Eberhardt et al. | 523/324 |
| 5,778,813 | 7/1998 | Kennedy | 114/74 A |

FOREIGN PATENT DOCUMENTS

| | | |
|---|---|---|
| 3005015A1 | 8/1981 | Germany . |
| 4307232 | 10/1992 | Japan . |
| 4307233 | 10/1992 | Japan . |
| 550553 | 3/1993 | Japan . |
| 550554 | 3/1993 | Japan . |
| 5138802 | 6/1993 | Japan . |
| 5229054 | 9/1993 | Japan . |

OTHER PUBLICATIONS

Jeffrey L. Sevart; O. Hayden Griffin, Jr.; Zafer Gürdal and Gail A. Warner, Flammability and Toxicity of Composite Materials for Marine Vehicles, *Naval Engineers Journal*, Sep. 1990, pp. 45–54.

(List continued on next page.)

*Primary Examiner*—Sherman Basinger
*Attorney, Agent, or Firm*—Darby & Darby

[57] ABSTRACT

A composite structural laminate comprise two outer metal, e.g. steel, layers and an intermediate elastomer core, e.g. of unfoamed polyurethane. The elastomer has a modulus of elasticity of greater than about 250 MPa and tensile and compressive strengths of at least 20 MPa. The strength of the bond between metal and elastomer is at least 3 MPa. The composite structural laminate member acts a single member under load, buckling globally, not asymmetrically.

29 Claims, 5 Drawing Sheets

OTHER PUBLICATIONS

Tomiyasu Okamoto; Tohru Hori; Masaru Tateishi; Sherif M.H. Rashed and Shigeru Miwa, Strength Evaluation of Novel Unidirectional–Girder–System Product Oil Carrier by Reliability Analysis, *SNAME Transactions*, vol. 93, 1985, pp. 55–77.

Robert D. Goldbach, MarC Guardin Tanker Concept–Introduction of a World Competitive American Environmental Tanker, *SNAME Transactions*, vol. 102, 1994, pp. 265–294.

Staff of Modern Plastics Magazine, Plastics Handbook, *Library of Congress Cataloging–in–Publication Data*, 1994, pp. 82–85, 209–11.

John C. Daldola, Tanker Structure Behavior During Collision and Grounding, *Marine Technology*, Jan. 1995, vol. 32, pp. 20–32.

Josef Linder, Development and Behavior of Advance Double Hull Sandwich Plate Systems: Experimental Investigation, *Masters of thesis*, Carlton U., Ottawa, Canada, Aug. 1995, pp. 1–134.

ASM International Handbook Committee, Engineered Materials Handbook, Engineering Plastics, *ASM International*, 1988.

COMPOSITE STRUCTURAL LAMINATE

CROSS REFERENCE TO RELATED APPLICATION

This application is a continuation-in-part of commonly assigned application Ser. No. 08/746,539, filed Nov. 13, 1996, and which is now U.S. Pat. No. 5,778,813, both of which is incorporated by reference herein, in its entirety.

FIELD OF THE INVENTION

The present invention relates to structural members having a sandwich structure, and particularly to members that can be used in load bearing applications, e.g. to replace stiffened steel plates.

BACKGROUND OF THE INVENTION

In applications such as ship hulls or bridge decks it has been known to increase the stiffness of steel plates by providing elongate stiffeners that comprise further steel girders welded perpendicularly to the main plate. The stiffeners may run in one direction or two orthogonal directions, depending on the forces to be borne by the plate. The use of stiffeners complicates the manufacturing process, adds significant weight and makes corrosion prevention and maintenance of the complete structure more difficult.

"Strength Evaluation of Novel Unidirectional-Girder-System Product Oil Carrier by Reliability Analysis" SNAME Transactions V93 1985 pp 55–77 describes an attempt to reduce the disadvantages of the provision of stiffeners in a ship hull by providing them only in one direction. This assists manufacture and maintenance of the ship to a certain extent but does not address other disadvantages of the provision of stiffeners.

Metal-plastic laminates with improved sound or heat insulating properties are known for use in cladding or roofing buildings, see for example U.S. Pat. No. 4,698,278. Such laminates generally employ foamed or fibrous materials and are not intended to, or capable of, bearing significant loads, i.e. significantly greater than self-weight and small loads due to localized wind or snow action.

U.S. Pat. No. 4,851,271 discloses the use of metal-plastic laminates to line oil pans to provide sound insulating properties. In such container applications the laminate as a whole will not bear loads significantly greater than self-weight and the container contents. Also, the lining layers do not contribute significantly to the structural strength of the laminate.

U.S. Pat. No. 5,219,629 discloses the use of aluminum sandwiches with a variety of core materials in the construction of truck trailer bodies. However, the aluminum layers are too thin and the core materials insufficiently strong to bear significant loads in larger structures.

"Behavior of Advanced Double Hull Sandwich Plate Systems: Experimental Investigation", a thesis by Josef Linder submitted in partial fulfillment of an M.Eng. at Carleton University, Ottawa, Canada, considered the use of a steel-polyurethane foam-steel sandwich for ship construction but concluded that it did not have sufficient flexural and bond strength nor sufficient energy absorption.

SUMMARY OF THE INVENTION

The present invention provides a structural laminate member comprising:

a first metal layer having a first inner surface and a first outer surface;

a second metal layer having a second inner surface, and a second outer surface, the second metal layer being spaced apart from said first metal layer; and an intermediate layer comprised of an elastomer located between and adhered to said first and second inner surfaces, said elastomer having a modulus of elasticity, E, greater than or equal to about 250 MPa and a ductility exceeding that of the metal layers.

The essential requirement of the invention is that the laminate behaves under load as a single member rather than three individual components and the mechanical properties of the intermediate layer and its bond to the outer layers must be selected to effect that. The intermediate layer must therefore have sufficient modulus of elasticity and ductility to be capable of transferring transverse forces that are encountered or expected in use between the two metal layers. Sufficient bond strength to transfer shear forces is also desirable.

In applications where the ability to withstand impacts is important, e.g. ship building, the intermediate layer must additionally have sufficient yield strength not to rupture under designed impact loads. Under extreme loads, the member will absorb greater energy than comparable single sheet metal members through strain dissipation, increased puncture resistance and inelastic membrane action of the member as a whole.

Preferably, the relative strengths and proportions of the two metal layers and the intermediate layer, particularly the stiffness of the intermediate layer, are selected such that the member, when subjected to extreme hogging and sagging loads, will buckle globally (as a whole) rather than anti-symmetrically or locally.

Also preferably, the intermediate layer should have ductility and a modulus of elasticity that is sufficient to spread a stress concentration at the tip of a crack in one metal layer in transferring it to the other so that the crack is prevented from propagating between the layers. The intermediate layer will also have a retarding effect on propagation of the crack in the layer in which it started.

The metal layers are preferably made of steel and each of thickness in the range of 3.5 to 25 mm. The minimum thickness is the thinnest sheet that can be effectively butt-welded, which is necessary for strength. At the upper limit, the advantages of the invention decrease. It is not necessary that the two metal layers are of the same thickness. In particular it is possible to provide a sacrificial excess on the side that, in use, will face a corrosive environment.

The plastic material preferably behaves as an elastomer at the loads expected in use and has a thickness in the range of from 20 to 100 mm. The thickness of the intermediate layer may vary across a member in some applications. The material is preferably compact, i.e. unfoamed, though some void spaces may be present, either intentionally or as a side-effect of the manufacturing method used, provided the desired properties of the composite are not reduced. It is believed that maximum acceptable void space in the intermediate layer is between 10 and 20%.

The use of the invention in complex structure, e.g. ships, allows reductions in complexity, weight and cost by eliminating the need for some or all stiffeners, eliminating or increasing the spacing of longitudinal and transverse girders, reducing surface areas requiring coating and reducing locations susceptible to corrosion.

BRIEF DESCRIPTION OF THE FIGURES

Exemplary embodiments of the invention will be described below with reference to the accompanying drawings, in which.

In the figures, like parts are identified by like numerals.

DETAILED DESCRIPTION OF THE INVENTION

Figure 1:
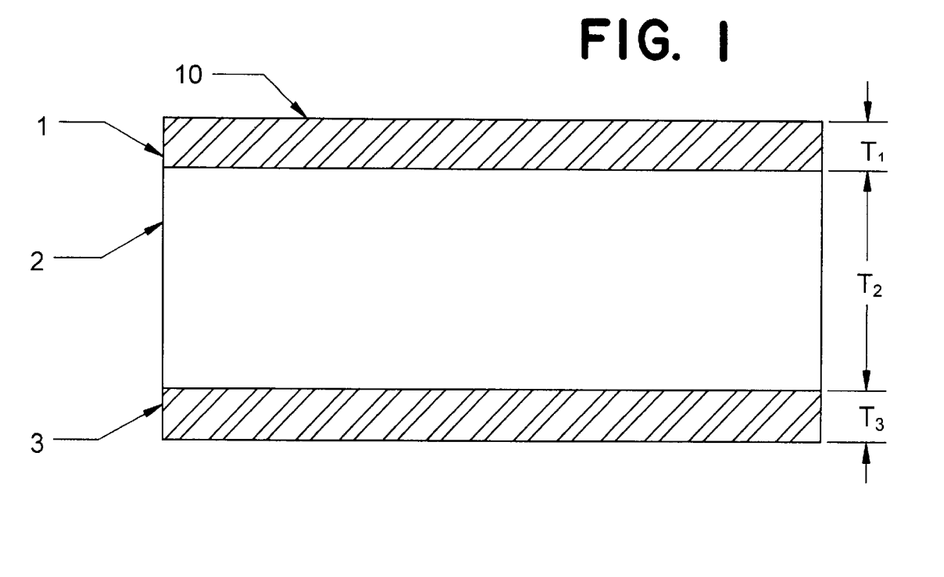
FIG. 1 is a cross-sectional view of a laminate member according to the invention.

FIG. 1 is a cross-sectional view of a laminate member 10 according to the present invention. The laminate member 10 comprises a first outer layer 1, an intermediate, or core, layer 2 and a second outer layer 3. The intermediate layer 2 is bonded to each of the first and second outer layers 1, 3 with sufficient strength to transfer shear loads between the outer layers so as to form a composite structural member capable of bearing loads significantly greater than self-weight.

The precise load to be borne by the laminate member will depend on the application to which it is to be put. For example, if the laminate member is to be used as a ship's hull plate in a 40,000 DWT oil tanker, it should be capable of withstanding an in-plane load of at least 10–12,000 kN in a 2 m width without buckling or a transverse load of at least 100 kPa, preferably 1,000 kPa or greater, without rupturing. For smaller vessels, especially yachts, the laminate member need not be so strong.

Figure 4:
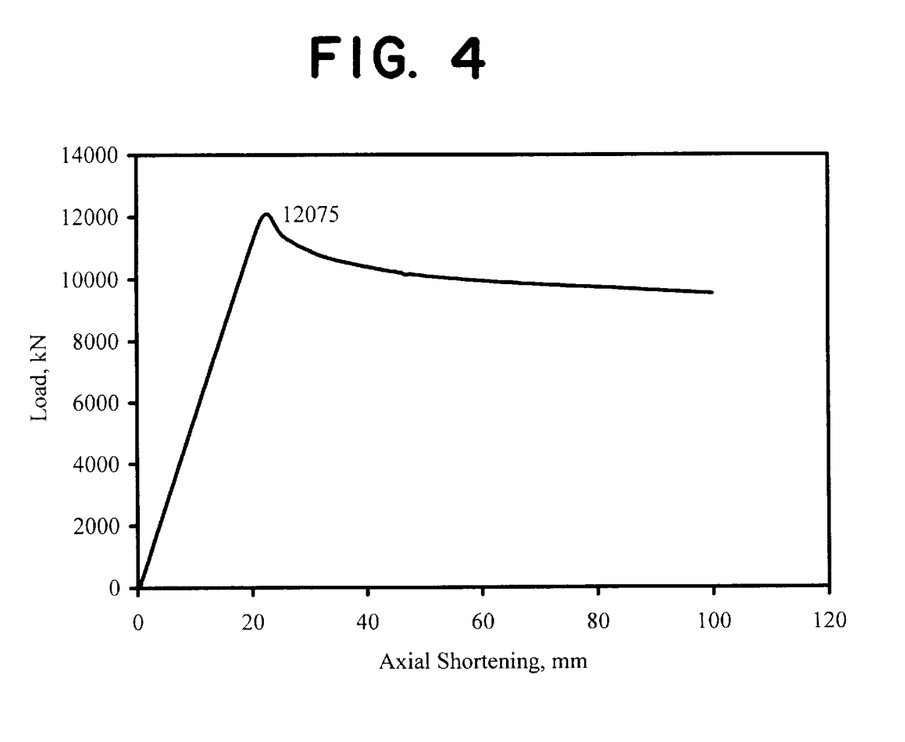
FIG. 4 is a graph showing axial shortening of a laminate member according to the invention under an in-plane load.

FIG. 4 shows a typical axial shortening load curve for a 2,000 mm wide laminate composite hull plate according to the invention. The load curve shows substantially linear shortening with load up to a load of 12,075 kN.

The first and second layers 1, 3 are made of metal and the intermediate layer 2 is made of a plastic or elastomeric material. The absolute and relative dimensions of the member and the precise materials employed will depend on the application to which the member is to be put. At a minimum the first and second outer layers will have a thickness of 3 mm and the intermediate layer 20 mm. The intermediate layer must also have a modulus of elasticity, E, of at least 250 MPa, preferably 275 MPa, at the maximum expected temperature in the environment in which the member is to be used. In ship building applications this may be 100° C. The elastomer should also not be too stiff so that E should be less than 2,500 MPa at the lowest expected temperature, −40 or −45° C. in ship building applications.

The tear, compression and tensile strengths as well as the elongation should be maximized to enable the composite laminate to absorb energy in unusual load events, such as impacts. In particular, the compressive and tensile strengths of the elastomer should be at least 20, and preferably 40, MPa. The compressive and tensile strengths can, of course, be considerably greater than these minima.

The metal layers are preferably structural steel though they may also be aluminum, stainless steel or other structural alloys in specialty applications where lightness, corrosion resistance or other specific properties are essential. The metal should preferably have a minimum yield strength of 240 MPa and an elongation of at least 20%. For many applications, especially ship building, it is essential that the metal is weldable.

The ductility of the elastomer at the lowest operating temperature must be greater than that of the metal layers, which is about 20%. A referred value for the ductility of the elastomer at the lowest operating temperature is 50%. The thermal coefficient of the elastomer must also be sufficiently close to that of the steel so that temperature variation across the expected operating range, and during welding, does not cause delamination. The extent by which the thermal coefficients of the two materials can differ will depend in part on the elasticity of the elastomer but it is believed that the thermal expansion coefficient of the elastomer may be about 10 times that of the metal layers. The coefficient of thermal expansion may be controlled by the addition of fillers to the elastomer.

The bond strength between the elastomer and metal layers must be at least 3, preferably 6, MPa over the entire operating range. This is preferably achieved by the inherent adhesiveness of the elastomer to steel but additional adhesives may be provided.

Additional requirements if the member is to be used in a ship building application, include that the tensile strength across the interface must be sufficient to withstand expected negative hydrostatic pressure and delaminating forces from steel connections. The elastomer must be hydrolytically stable to both sea and fresh water and if the member is to be used in an oil tanker must have chemical resistance to oils.

The elastomer therefore essentially comprises a polyol (e.g. polyester or polyether) together with an isocyanate or a di-isocyanate, a chain extender and a filler. The filler is provided, as necessary, to reduce the thermal coefficient of the intermediate layer, reduce its cost and otherwise control the physical properties of the elastomer. Further additives, e.g. to control hydrophobicity or adhesion, and fire retardants may also be included.

The ratio of the total thickness of the outer layers to the thickness of the elastomer, $(T_1+T_3)/T_2$, is in the range of from 0.1 to 2.5.

Coatings, e.g. for cosmetic or corrosion resistance reasons, may be applied to the outer surfaces of the metal layers either before or after fabrication of the laminate.

The member of the present invention is substantially stronger and stiffer than a member of the same thickness of metal but no intermediate layer. This is because the member acts in an analogous manner to a box girder or I-beam with the intermediate layer performing the function of the web(s). To so function the intermediate layer itself and the bonds to the outer layers must be sufficiently strong to transfer the forces that will arise in use of the member.

A further advantage of the present invention, of particular benefit in ship building, is that the intermediate layer acts to prevent crack propagation between the inner and outer layer. The elasticity of the intermediate layer prevents the stress concentration at the tip of a crack in one outer layer being transmitted to the other as a rigid connection would; instead the load is spread out.

Figure 3:
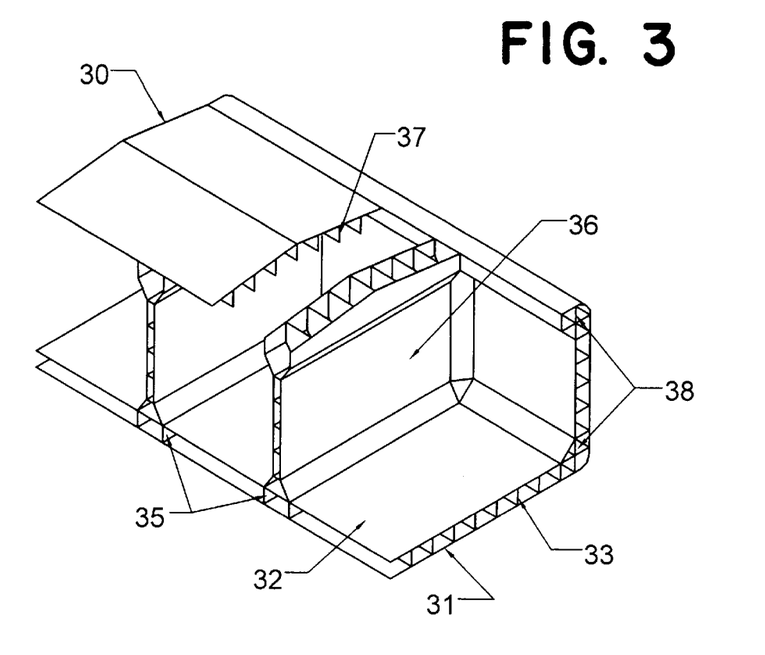
FIG. 3 is a partly sectional view of a double hull vessel constructed using the laminate member of the invention.

FIG. 3 shows, partly in section, the hull of an oil tanker 30 designed to take advantage of the structural laminate member of the invention. The inner 32 and outer 31 hulls of the vessel are each constructed of laminate structural members according to the invention with 10 mm steel outer layers and a 50 mm polyurethane elastomer core. The two hulls are connected together by simple steel plate longitudinal girders 33 and transverse web plates 35 at the double walled transverse bulk heads 36, with additional longitudinal steel plates 38 in gunwale and bilge areas. The need for longitudinal or transverse stiffeners for both hulls is eliminated.

The double walled transverse bulkheads 36, deck and longitudinal deck girders 37 are also constructed from laminate structural members according to the invention. This eliminates the need for further stiffeners. The longitudinal deck girders 37 may be replaced by transverse girders.

The preferred method of fabricating a laminate member according to the invention is to cast, or inject, the elastomer directly into a cavity formed by the two metal layers. If this is done horizontally, the metal plates are preferably held apart by spacers, which may be metal or elastomeric. If the spacers are elastomeric than they must be compatible with the material forming the bulk of the intermediate layer and slightly taller than the desired spacing so that they compress to the correct distance under the weight of the upper plate. The spacers may be elongate to divide the cavity into spaces that may be filled separately or simply plugs around which the elastomer flows. If elongate, the spacers may be rectangular or trapezoidal in cross-section and may vary in height along their length to provide members with varying elastomer thickness. The spacers must be bonded to the steel plates with bonding agents or elastomer-compatible compounds with sufficient strength to hold the plates in place during the injection process until the elastomer is sufficiently cured.

Figure 2:
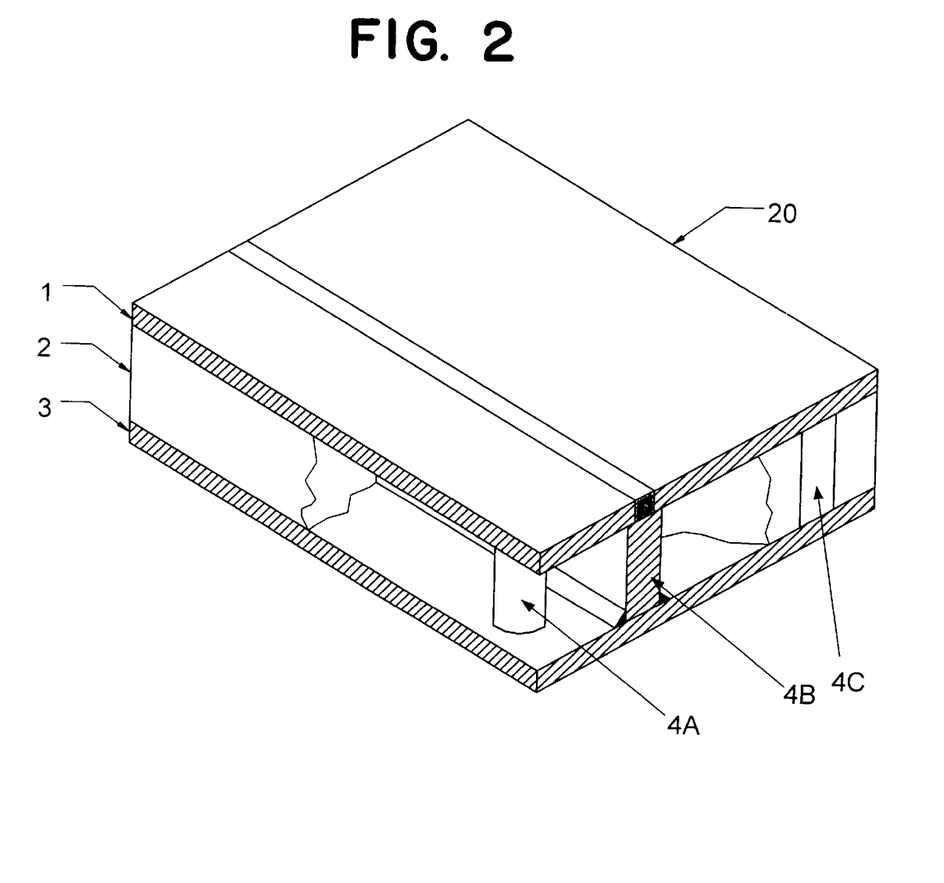
FIG. 2 is a partly cut-away perspective view of a laminate member according to the present invention including spacers.

FIG. 2 shows, for illustrative purposes, three different types of spacers that may be used in constructing laminate members according to the invention. A cylindrical elastomer plug 4A is used to support the upper plate without dividing the cavity to be filed. If the cavity needs to be bounded or divided an elongate member spacer 4B or an elongate elastomer spacer 4C may be used. The metal spacer 4B may be fillet welded to the lower plate and support a butt weld between two sections of the upper plate, or act as backing bar for that weld. The elastomer plug 4A and the elongate elastomer spacer 4C may be adhered to the metal plates before casting and may be made of substantially the same elastomer as will be injected or a different elastomer compatible with the elastomer to be injected. An actual laminate member may not require all of these different types of spacer.

During casting the plates may be held at an incline to assist elastomer flow, or even vertical, though the hydrostatic head of the elastomer during casting should not be excessive and the flow of the displaced air should be optimized. The plates may also be fixed in place in the structure and filled with elastomer in situ.

Figure 8:
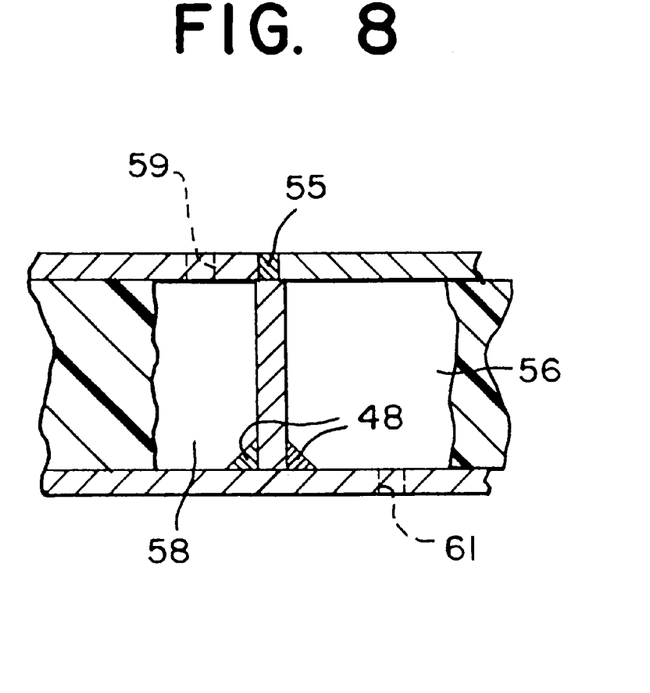
FIG. 8 is a cross section view of a composite panel under construction according to the present invention.
Figure 9:
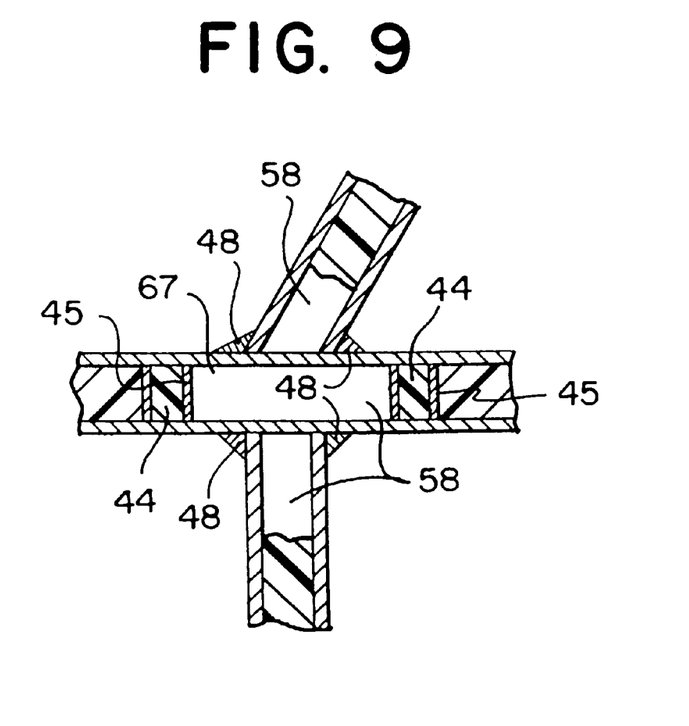
FIG. 9 is a cross section view of an inner hull, bulkhead and composite spacer constructed with composite panels according to the present invention.

Referring now to FIGS. 8 and 9, to enable welding of the member to the other members or an existing structure, it is necessary to leave a sufficient weld margin 58 around the edges to ensure that the elastomer and its bond to the steel plate are not damaged by the heat of welding. The width of the weld margin 58 will depend on the heat resistance of the elastomer and the welding technique to be used but may be about 75 mm. If the elastomer is cast between the plates, the welding margin will need to be defined by elongate spacers 45. The member is now welded to the other members by weld 48. Welding margin 58 is then filled with an uncured second elastomer. The second elastomer is then cured so that it bonds to the first and second metal layers and to the intermediate layer. The first and second elastomers may, in one embodiment, be the same material. As illustrated in FIG. 8, an aperture 59 is provided through one of the metal layers to access the weld margin 58 so that the uncured second elastomer can be injected into cavity 56. A second vent aperture 61 is provided into cavity 56. As illustrated, aperture 61 is spaced from injection port or aperture 59. Apertures 59, 61 can then be filled with a plug that has galvanic characteristics compatible with the metal layers.

The number of injection ports required will depend on the available equipment for pumping the components of the elastomer and to provide minimum splash (ideally splash free) and air entrainment (to minimize void spaces) as well as the gel time of the elastomer. The ports should be situated in appropriate places for the use to which the member is to be put. If the member is to be used as a hull plate in a double-hulled ship, the injection ports are ideally situated so as to face the inter-hull gap rather than the sea or cargo space. The injection ports are ideally quick disconnect ports, possibly with one-way valves, that can be ground off after casting. They may also be sealed with plugs that are ground smooth after casting.

Air vents are placed in each cavity to allow escape of all air in the cavity and to ensure no void space is left. The air vents may be threaded to allow insertion of plugs after filling or include valves or other mechanical devices which close after filling. The air vents and any plug or valve may be ground smooth after the elastomer has set.

Plugs inserted in injection ports or air vents should be made of a material that has galvanic characteristics compatible with the metal layers. For example, if the metal layers are steel, the plugs may be of brass.

The injection process must be monitored to ensure even filling of the cavity without any back pressure which might cause swelling and uneven plate thickness. The injection can also be carried out using tubes that are withdrawn progressively as the cavity fills.

After manufacture and during the life of the laminate, it may be necessary to verify that the elastomer has correctly adhered to the metal layers. This can be done using ultrasound or x-ray techniques.

To repair damaged members, or if the elastomer has not properly adhered, the damaged region of the steel plate is sawn (cold cut) or flame cut and the elastomer is cut or gouged out, e.g., using a router or pressurized water (hydro blasting) until good elastomer is exposed and a weld margin is created. The exposed surface of the remaining elastomer must be sufficiently clean for new elastomer, cast in situ, to adhere.

An alternate method of fabrication is to glue reformed slabs of elastomer to metal plates.

Figure 5:
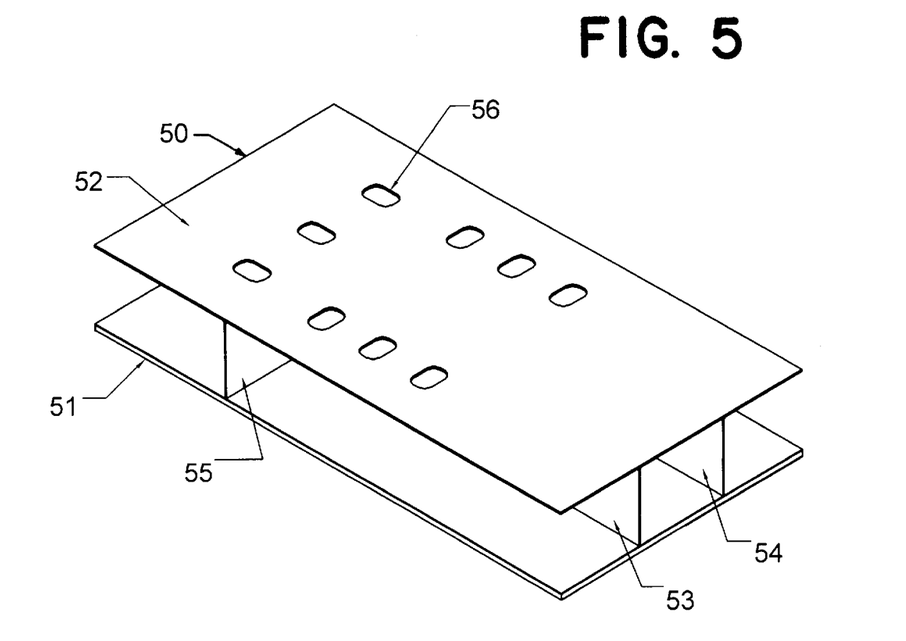
FIG. 5 is a perspective view of a test sample incorporating a plate according to the invention.

A test specimen of a keel plate for a bulk carrier vessel using a composite structural laminate of the invention as the outer hull was constructed. The specimen 50 is shown in FIG. 5 and comprised outer hull plate 51, inner hull plate 52, longitudinal girders 53, 54 and a transverse floor 55. Access holes 56 for measurement devices were also provided, but would not normally be necessary.

The outer hull plate 51 comprised first and second metal layers of 8 mm mild steel and an intermediate layer of 50 mm polyurethane elastomer core, substantially free of voids.

For simplicity, the inner hull was a single 8 mm steel plate separated from the outer hull by the longitudinal girders 53, 54 which were 700 mm in height. In actual applications, the inner hull would usually also be a member according to the invention, but not necessarily of the exact same dimensions. The specimen measured 2600 by 5000 mm in plan.

Within the outer hull plate, longitudinal and transverse cavity spacers were provided to ensure proper casting of the elastomer with the available equipment. These may be dispensed with if the whole cavity of the outer plate can be cast in one operation.

Figure 6:
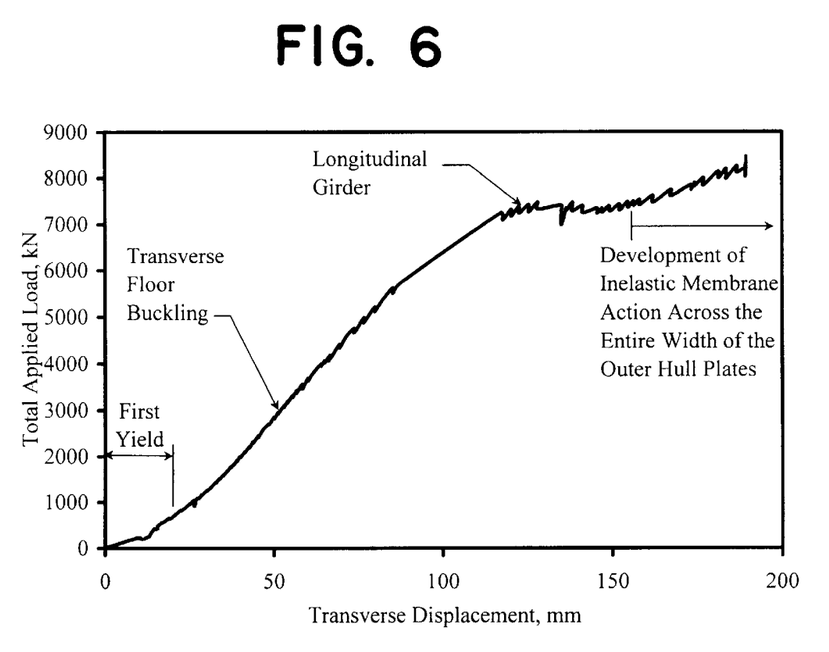
FIG. 6 is a graph illustrating the behavior of the test sample under transverse load.

The test specimen was mounted in a horizontal reaction frame to represent the stiffness of the surrounding ship structure and load was applied by four 500 Tonne hydraulic actuators. The behavior of the test specimen under load is illustrated in FIG. 6 which shows the transverse displacement versus the applied load.

Shear tension failure of the outer plate of the outer hull occurred at an applied load of 8201 kN.

Figure 7:
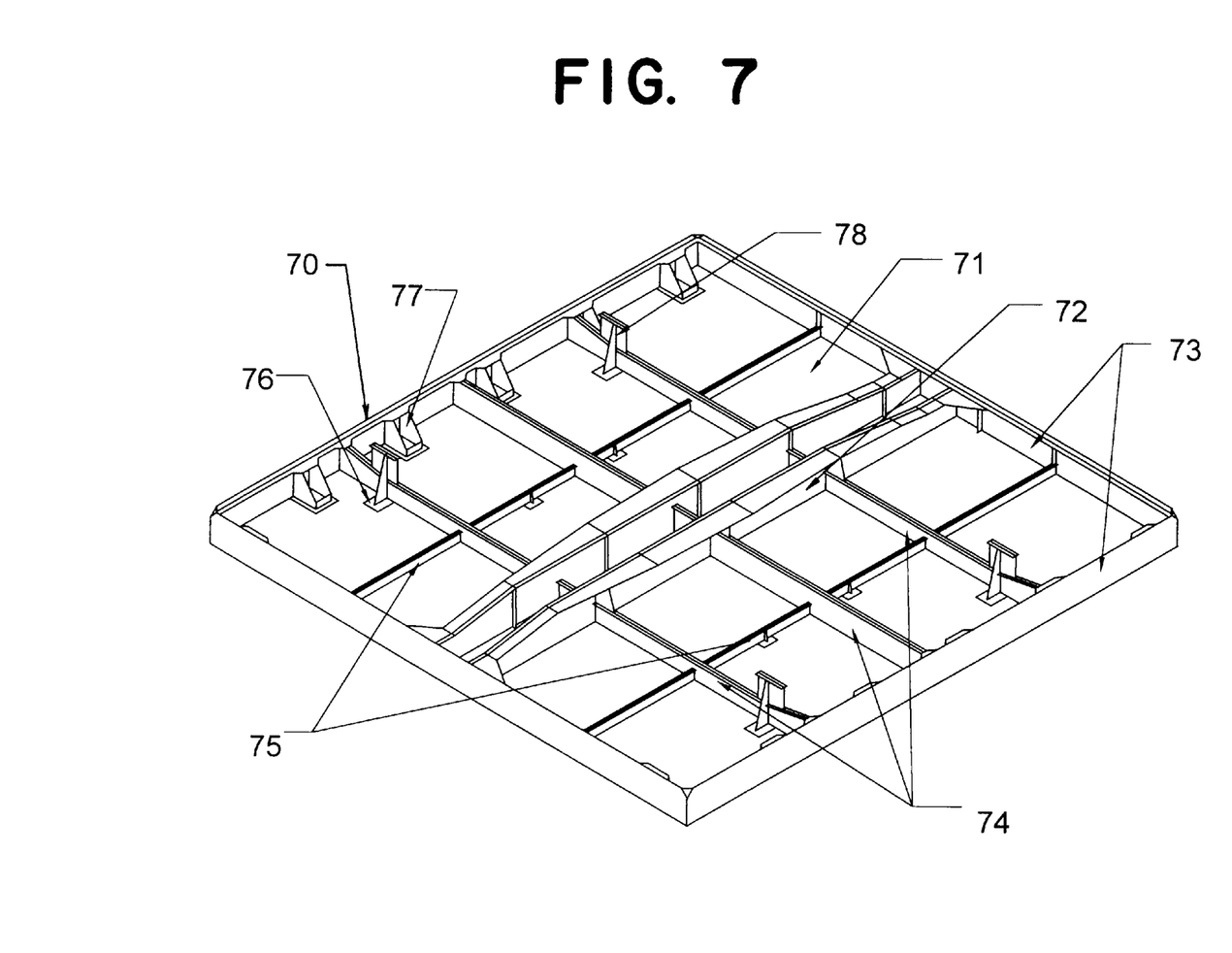
FIG. 7 is a perspective view of a hatch cover for a container vessel constructed using laminate members according to the invention.

FIG. 7 shows a hatch cover for a container vessel satisfying Lloyd's Register Rules and Regulations designed using plates according to the invention. The plates 71 comprised outer layers of 4 mm steel and an intermediate layer of 25 mm and do not require any stiffeners. Main girders 72 and edge girder 73 are of conventional form but the secondary beams 74 are reduced in number. Tertiary beams 75 are provided for the hatch cover lift and edge girder brackets 77 allow direct removal of container loads. Doubling plates 76 are provided as necessary.

The intermediate layer was provided with filler to control the coefficient of thermal expansion of the elastomer to be closer to that of steel ($12 \times 10^{-6}$ mm/mm/° C.) to prevent delamination caused by temperature changes.

The resulting hatch cover was of equivalent, or greater, strength than a conventional all-steel stiffened design and of considerably simpler construction, owing to the reduction in the length of weld as well as the number of stiffeners and details required.

The present invention has been described above largely in relation to ship building applications. However, the invention is also useful in other applications, especially those where high in-plane and transverse loads are expected, where high rupture strength, high fatigue strength or high resistance to crack propagation is desirable.

What is claimed is:

1. A structural laminate member comprising:
   a first metal layer having a first inner surface and a first outer surface;
   a second metal layer having a second inner surface, and a second outer surface, the second metal layer being spaced apart from said first metal layer, and
   an intermediate layer comprised of an elastomer located between and adhered to said first and second inner surfaces, said elastomer having a modulus of elasticity, E, greater than or equal to about 250 MPa and a ductility exceeding that of the metal layers.

2. A structural laminate member according to claim 1 wherein said elastomer has a modulus of elasticity greater than or equal to about 275 MPa.

3. A structural laminate member according to claim 1 wherein said elastomer has tensile and compressive strengths of at least 20 MPa.

4. A structural laminate member according to claim 1 wherein said elastomer is compact.

5. A structural laminate member according to claim 4 wherein the total void space in the intermediate layer is less than about 20% of the total volume of the intermediate layer.

6. A structural laminate member according to claim 1 wherein said elastomer is polyurethane.

7. A structural laminate member according to claim 1 wherein said intermediate layer has a thickness in the range of from about 20 to about 100 mm.

8. A structural laminate member according to claim 1 wherein at least one of said first and second metal layers is steel.

9. A structural laminate member according to claim 1 wherein said first and second metal layers each has a thickness in the range of from about 3.5 to about 25 mm.

10. A structural laminate member according to claim 1 wherein the ratio of the total thickness of the first and second metal layers to the thickness of the intermediate layer is in the range of from 0.1 to 2.5.

11. A boat or ship including at least one structural laminate member according to claim 1.

12. A method of making a structural laminate member comprising the steps of:
   providing first and second metal layers in a spaced apart relationship so that a core cavity is defined therebetween;
   filling said core cavity with an uncured elastomer that, when cured, will have a modulus of elasticity, E, greater than or equal to about 250 MPa and a ductility exceeding that of the metal layers; and
   curing said elastomer so that it adheres to said metal layers.

13. A method according to claim 12 wherein said filling step is carried out to minimize air entrainment such that the proportion of void space after curing is less than 20%.

14. A method according to claim 12 further comprising the step, prior to said filling step, of providing at least one vent aperture in said cavity spaced from an injection port used for filling said core cavity with said elastomer.

15. A method according to claim 14 further comprising the step, after said curing step, of sealing said at least one vent aperture.

16. A method according to claim 15 wherein said step of sealing comprises sealing said at least one vent aperture with a plug having galvanic characteristics compatible with said metal layers.

17. A method according to claim 16 wherein said plug is made from metal.

18. A method according to claim 12 further comprising the step of providing spacers to maintain the separation of said first and second metal layers during said filling and curing steps.

19. A method according to claim 18 wherein said spacers are provided to define side edges of the cavity such that said intermediate elastomer layer is recessed from the first and second metal layers at at least one edge to provide a welding margin.

20. A method of joining a structural laminate member, comprising first and second metal layers and an intermediate layer formed of a first elastomer, to another member, the method comprising the steps of:
   providing a welding margin adjacent a portion of said structural laminate member whereby said intermediate layer is recessed from said first and second layers;
   welding said portion to said other member,
   filling said welding margin with an uncured second elastomer, and
   curing said uncured second elastomer such that it bonds to said first and second metal layers and to the intermediate layer.

21. A method according to claim 20 wherein said portion is an edge portion.

22. A method according to claim 20 wherein said step of providing a welding margin is performed during manufacture of said structural laminate member.

23. A method according to claim 20 wherein said step of providing a welding margin comprises removing a part of said intermediate layer adjacent said portion.

24. A method according to claim 23 wherein said step of removing further comprises routing or hydro blasting.

25. A method according to claim 20 wherein said other member is a structural laminate member comprising first and second metal layers and an intermediate layer of elastomer.

26. A method according to claim 20 wherein said first and second elastomers are the same.

27. A method according to claim 20 wherein said step of filling comprises providing at least one filling aperture through said first or second metal layer or said intermediate layer to said weld margin and providing said uncured second elastomer to said weld margin through the or each filling aperture and said method further comprises the step of, after said curing step, sealing the or each filling aperture.

28. A method according to claim 22 wherein said step of sealing comprises sealing the or each aperture with a plug having galvanic characteristics compatible with said metal layers.

29. A method according to claim 20 wherein said welding margin has a width of at least about 75 mm.

* * * * *